United States Patent [19]
Hay

[11] 3,856,186
[45] Dec. 24, 1974

[54] PRESSURE VESSEL FILL AND BLEED VALVE ASSEMBLY

[75] Inventor: Charles N. Hay, Sandusky, Ohio

[73] Assignee: General Motors Corporation, Detroit, Mich.

[22] Filed: June 25, 1973

[21] Appl. No.: 373,285

[52] U.S. Cl.............. 222/402.16, 137/802, 141/18
[51] Int. Cl............................................ B65d 47/10
[58] Field of Search .............. 280/150 AB; 102/39; 222/402.16, 5, 541, 3; 141/18, 20, 3; 23/281; 137/802

[56] References Cited
UNITED STATES PATENTS
3,638,840  2/1972  Ishida................................. 222/541

*Primary Examiner*—Houston S. Bell, Jr.
*Attorney, Agent, or Firm*—Herbert Furman

[57] ABSTRACT

A valve assembly includes a cylindrical housing having a flanged inner end engageable with the wall of a pressure vessel to locate the housing within an aperture in the wall. The housing is welded to the wall. The outer end of the housing includes a frustoconical seat and a like-shaped opening. A valve member is slidably received within the housing and is biased to a seated position by a coil compression spring seating between the valve member and a spring seat secured within the housing adjacent the inner end thereof. A tube extends through the valve member and through the spring seat internally of the spring. The tube is secured to the valve member and the outer end of the tube is pinched off and sealed. The valve member is displaced to fill the pressure vessel through the opening and is soldered to the housing opening after filling. When the sealed outer end of the tube is removed, the tube provides a bleed valve.

4 Claims, 2 Drawing Figures

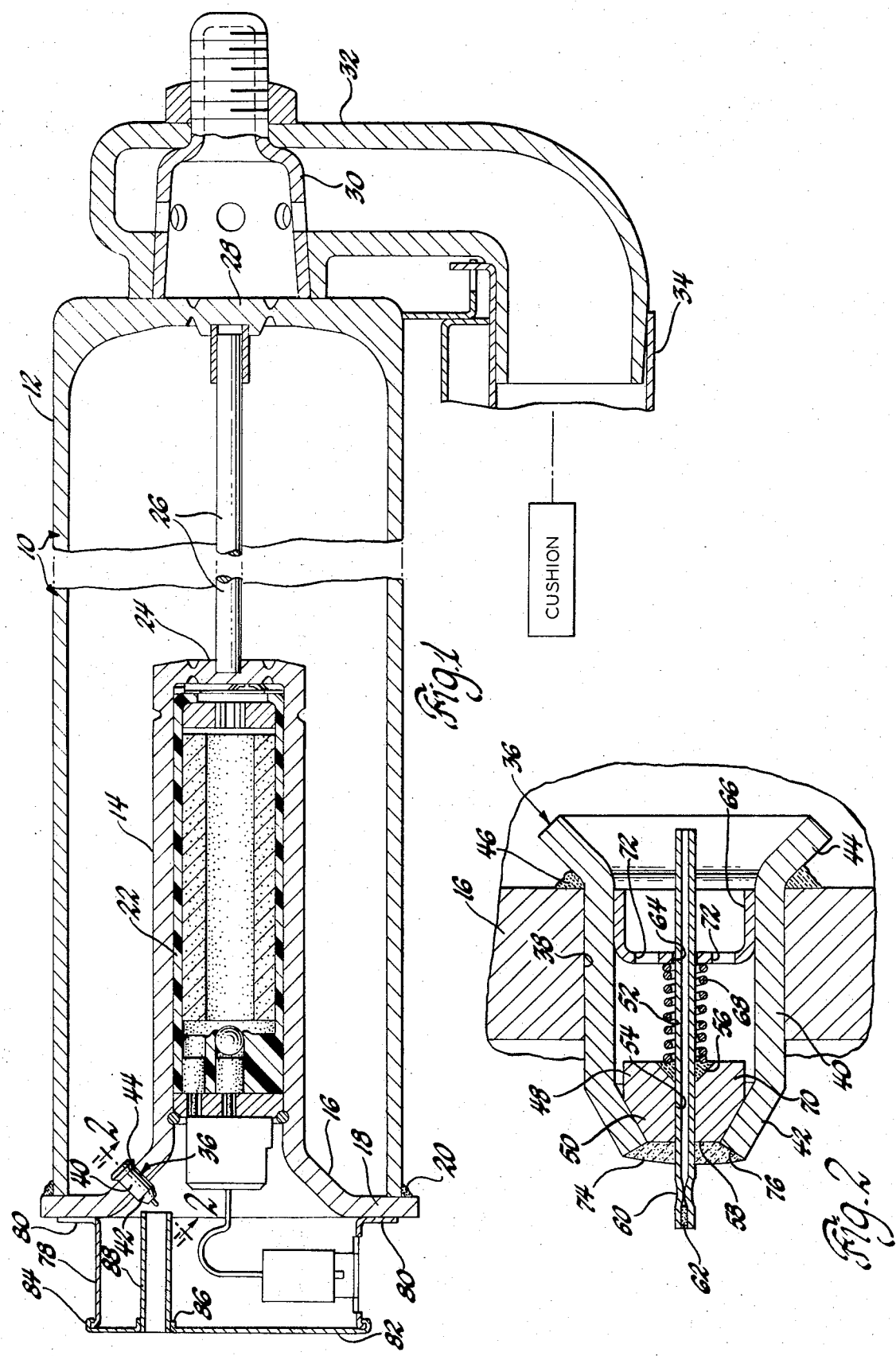

PRESSURE VESSEL FILL AND BLEED VALVE ASSEMBLY

This invention relates generally to pressure vessel fill and bleed valve assemblies and more particularly to such an assembly wherein the fill valve is permanently sealed after the pressure vessel has been filled and the bleed valve can be opened at any time by removal of a normally closed portion of a passage through the fill valve.

Bleed and fill valves for pressure vessels are well known. The fill valve may be of various types and among the more common types are displaceable valve members which normally seat against a valve seat of a housing under a resilient bias. Likewise the bleed valves can be of many different types provided that they provide for a slow rate of escape of the pressure fluid.

The valve assembly of this invention combines the bleed and fill valves into one unit. The fill valve is generally provided by a displaceable valve member which is resiliently biased to its closed position. Once the fill valve has performed its function of permitting flow of pressure fluid into the pressure vessel, it is permanently sealed to the valve housing. The valve member of the fill valve includes an outer extension having a sealed outer end. The extension opens to a passage through the valve member. When the sealed outer end of the extension is removed by a suitable tool, pressure fluid from the vessel can bleed through the passage and through whatever portion of the extension is not removed. In order to aid removal of the sealed end of the extension, a guide is mounted on the pressure vessel to guide the removal tool.

The primary object of this invention is to provide an improved fill and bleed valve assembly for pressure vessels wherein the fill valve is permanently sealed after it has performed its function and the bleed valve is incorporated in the fill valve. Another object of this invention is to provide such an assembly wherein the bleed valve is permanently sealed at all times and is opened when a portion of the valve is removed by a suitable tool. A further object of this invention is to provide such an assembly wherein the bleed valve is provided by a sealed extension of a movable valve member of the fill valve assembly, with this extension opening through the movable valve member to the pressure vessel and permitting bleed of the pressure fluid through the movable valve member to atmosphere upon removal of the sealed portion thereof.

These and other objects of the invention will be readily apparent from the following specification and drawings wherein:

FIG. 1 is a sectional view of an augmented type inflator embodying a valve assembly according to this invention; and FIG. 2 is an enlarged sectional view taken generally along the plane indicated by line 2—2 of FIG. 1 and showing the valve assembly.

Referring now to FIG. 1 of the drawings, an augmented type inflator 10 includes a cylindrical pressure vessel 12 and a cylindrical combustion chamber 14 which includes a tapered wall 16 and a terminal flange 18 welded at 20 to the pressure vessel. The pressure vessel 12 is normally filled with a suitable fluid, such as argon, at 2,400 psi. The combustion chamber 14 includes a cartridge assembly 22 which generates high temperature, high pressure gas when initiated. This gas flows to the pressure vessel 12 through a rupturable seal 24. A rod 26 is secured at one end to seal 24 and impacts a rupturable seal 28 of the pressure vessel to open the pressure vessel when seal 24 is opened. The fluid in the pressure vessel and the generated gas then flow through an outlet member 30 into a manifold 32, a diffuser 34, and then to an occupant restraint cushion to inflate the cushion.

The details of the inflator 10 and its operation form no part of this invention. Reference may be had to copending application Ser. No. 373,388, Richard L. Merrell, filed June 25, 1973, Ser. No. 331,663, Charles N. Hay, filed Feb. 12, 1973, and Ser. No. 373,282, Philip B. Ziegler, filed June 25, 1973, for such details.

A pressure vessel fill and bleed valve assembly 36 according to this invention is mounted within an opening 38 in the tapered wall 16 of the combustion chamber in order to permit filling of the pressure vessel 12 with the pressure fluid and to also permit bleed of this fluid from the pressure vessel whenever desired. As shown in FIG. 2, the valve assembly includes a cylindrical housing 40 having a generally frustoconical shaped outer end portion 42 and an outwardly flared inner end portion 44. The housing 40 is welded at 46 to wall 16 after insertion in opening 38 to permanently assemble the housing to the inflator. The flared inner end portion provides a limit stop for locating the housing upon assembly.

A valve plug or member 48 is slidably received within the housing 40. This member includes a frustoconical shaped outer end portion 50 which is complementary in shape to the inner surface of housing portion 42 and seats thereagainst when the valve member is in closed position as shown in FIG. 2. A tube 52 extends through an axial bore 54 of the valve member and is permanently affixed to the valve member by being soldered thereto at 56. The tube provides a passage through the valve member. An extension or outer end portion of the tube extends outwardly of the apical wall 58 of the valve member and is pinched off at 60 and permanently sealed with solder 62. The inner end portion of the tube extends through a central aperture 64 in the base wall of a cup-shaped spring seat 66 which is received within the housing 40 adjacent the flange 44 and is permanently affixed to the housing. A coil compression spring 68 seats on the base wall of the spring seat and on the circular basal portion 70 of the valve member to continually bias the valve member to closed position as shown. The base wall of the spring seat is provided with a number of elongated or circular apertures 72 to permit fluid flow through this wall. The inner end portion of the tube 52 functions to locate the spring relative to the valve member 48 and spring seat 66.

The pressure vessel can be conventionally filled with pressure fluid by displacing the valve member 48 inwardly of the housing 40 against the bias of spring 68. The pressure fluid flows between the housing and the valve member and then through the openings 72 into the pressure vessel.

After the pressure vessel has been filled, the valve member 48 is sealed to the housing by solder 74. The solder is flowed into the cavity defined by a frustoconical wall 76 defining the opening of the housing portion 42 and by the apical wall 58 of the valve member. Wall 76 is of opposite hand to the inner surface of the housing portion 42.

With reference to FIG. 1, a cylindrical housing 78 includes a number of lateral tabs 80 which are welded to the flange 18 in order to mount the housing thereon. A wall 82 is crimped at 84 to the housing to close the housing. The wall 82 is provided with a cylindrical lateral flange 86. A guide tube 88 is secured at one end to flange 86 and extends therefrom to closely adjacent the sealed outer end portion of the tube 52.

If at any time it is desired to bleed the pressure fluid from the pressure vessel 12, a suitable removal tool, such as an electrically driven drill bit, is inserted through the tube 88 and the portions 60 and 62 of the tube 52 are removed to open the tube to atmosphere. The contents of the pressure vessel can then bleed to atmosphere through the tube.

Although the valve assembly of this invention has been shown and described in conjunction with an inflator of the augmented type, it will be understood that it can be used with any type of pressure vessel which is filled with pressure fluid and which may require bleed down.

Thus, this invention provides an improved pressure vessel fill and bleed valve assembly.

I claim:

1. In combination with a pressure vessel having an apertured wall, a fill and bleed valve assembly, comprising, an annular hollow housing adapted to extend through the aperture in the wall of the pressure vessel and to be secured thereto, said housing including an outer end portion provided with a tapered inner surface, a valve member slidably received within the housing and including an outer tapered surface complementary to the tapered inner surface of the housing, resilient means biasing the valve member outwardly of the housing to seat the tapered outer surface thereof on the tapered inner surface of the housing, said valve member including a bore therethrough opening at its inner end to the housing and opening at its outer end to a hollow extension projecting outwardly of the valve member and of the outer end of the housing, means closing the outer end portion of the extension, the valve member being displaceable against the resilient biasing means to permit pressure fluid to flow between the valve member and the housing into the pressure vessel to fill the vessel, and means permanently sealing the valve member to the housing after the pressure vessel has been filled, removal of the closed outer end portion of the extension permitting pressure fluid to bleed out of the pressure vessel through the bore of the valve member and any unremoved portion of the extension.

2. In combination with a pressure vessel having an apertured wall, a fill and bleed valve assembly, comprising, an annular hollow housing adapted to extend through the aperture in the wall of the pressure vessel and to be secured thereto, said housing including an outer end portion provided with a tapered inner surface, a valve member slidably received within the housing and including an outer tapered surface complementary to the tapered inner surface of the housing, spring seat means secured to the housing adjacent the inner end portion thereof, resilient means seating on the valve member and spring seat means to bias the valve member outwardly of the housing and seat the tapered outer surface thereof on the tapered inner surface of the housing, said valve member including an axial bore therethrough opening at its inner end to the housing and opening at its outer end to a hollow annular extension projecting outwardly of the valve member and of the outer end of the housing, means closing the outer end portion of the extension, the valve member being displaceable against the resilient biasing means to permit pressure fluid to flow between the valve member and the housing into the pressure vessel to fill the vessel, and means rigidly securing the valve member to the outer end portion of the housing after the pressure vessel has been filled, removal of the closed outer end portion of the extension permitting pressure fluid to bleed out of the pressure vessel through the bore of the valve member and any unremoved portion of the extension.

3. In combination with a pressure vessel having an apertured wall, a fill and bleed valve assembly, comprising, an annular hollow housing adapted to extend through the aperture in the wall of the pressure vessel and to be secured thereto, said housing including an outer end portion provided with a tapered inner surface, a valve member slidably received within the housing and including an outer tapered surface complementary to the tapered inner surface of the housing, resilient means biasing the valve member outwardly of the housing to seat the tapered outer surface thereof on the tapered inner surface of the housing, said valve member including a bore therethrough opening at its inner end to the housing and opening at its outer end to a hollow extension projecting outwardly of the valve member and of the outer end of the housing, means closing the outer end portion of the extension, the valve member being displaceable against the resilient biasing means to permit pressure fluid to flow between the valve member and the housing into the pressure vessel to fill the vessel, means permanently sealing the valve member to the housing after the pressure vessel has been filled, and tool guide means mounted on the wall of the pressure vessel for guiding a removal tool into engagement with the closed outer end portion of the extension, removal of the closed outer end portion of the extension permitting pressure fluid to bleed out of the pressure vessel through the bore of the valve member and any unremoved portion of the extension.

4. In combination with a pressure vessel having an apertured wall, a fill and bleed valve assembly, comprising, an annular hollow housing adapted to extend through the aperture in the wall of the pressure vessel and to be secured thereto, said housing including a frustoconical outer end portion provided with an opposite hand frustoconical opening, a valve member slidably received within the housing and including a frustoconical outer end portion complementary to the end portion of the housing, resilient means seating the frustoconical portion of the valve member within the end portion of the housing with the apical wall thereof generally coplanar with the apical end of the opening of the housing, said valve member including a bore therethrough opening at its inner end to the housing and opening at its outer end to a hollow extension projecting outwardly of the apical wall of the end portion of the valve member and the opening of the housing, means closing the outer end portion of the extension, the valve member being displaceable against the resilient biasing means to permit pressure fluid to flow between the valve member and the housing into the pressure vessel to fill the vessel, the cavity defined by the wall of the housing opening and the apical wall of the end portion of the valve member being filled with solder after the pressure vessel has been filled to permanently secure the valve member to the outer end portion of the housing, removal of the closed outer end portion of the extension permitting pressure fluid to bleed out of the pressure vessel through the bore of the valve member and any unremoved portion of the extension.

* * * * *